Oct. 31, 1950      T. MENSFORTH      2,528,012
LOADING APPARATUS

Filed April 10, 1945      6 Sheets-Sheet 3

INVENTOR
*Thomas Mensforth*

Oct. 31, 1950 T. MENSFORTH 2,528,012
LOADING APPARATUS
Filed April 10, 1945 6 Sheets-Sheet 5

INVENTOR
Thomas Mensforth

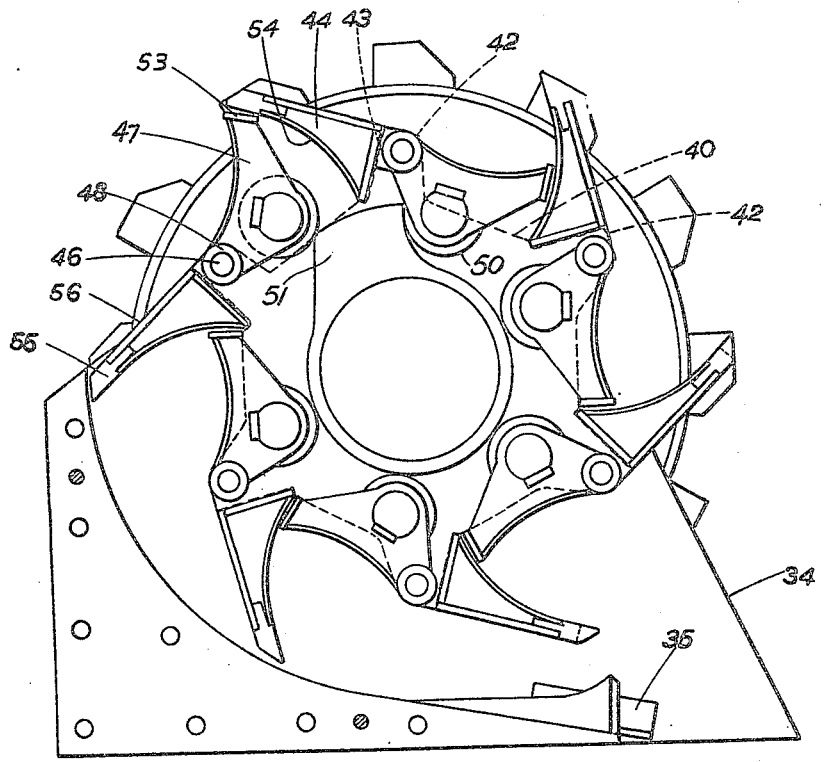

Patented Oct. 31, 1950

2,528,012

UNITED STATES PATENT OFFICE 2,528,012

LOADING APPARATUS

Thomas Mensforth, Westminster, London, England, assignor to John Brown & Company Limited, Westminster, London, England, a British company Application April 10, 1945, Serial No. 587,451
In Great Britain February 4, 1944

12 Claims. (Cl. 198—9)

This invention relates to loading apparatus for transferring material from a heap to a loading station, and particularly to apparatus for moving worked coal from the coal face onto a conveyor (referred to as a face conveyor) disposed away from the face, which conveyor passes the coal onto the tubs or like vehicles. For example, in the "long wall" method of working coal, the worked coal lies heaped on the floor of the mine up to the unworked coal face, and the face conveyor, which is raised slightly above the floor level, extends parallel with but at a distance set from the face. Thus, it is necessary for the loading apparatus, not only to move the coal from the heap towards the face conveyor, but also to deliver it at a height above floor level.

The principal object of my invention, as indicated above, is to provide an apparatus adapted to lift loose coal from the floor of the mine, elevate it and lower it onto a conveyor, although its usefulness is not limited to loading coal.

According to this invention, a loading apparatus comprises a number of elevating members, means for moving said members successively towards and into the heaped material at a low level and after raising a portion of the material to withdraw it away from the heap at a higher level, and a conveyor arranged with its path of movement away from the elevating members, which elevating members are arranged, after withdrawing the material from the heap, to deliver it onto the conveyor, or onto a chute leading to the conveyor. Preferably, said elevating members are mounted directly on a rotor which is arranged with its axis of rotation extending in a general direction in which it is required to move the material.

The elevating members may comprise scoop-like blades extending in a direction along the axis of rotation of the rotor, and spaced therearound, the spaces between adjacent blades constituting troughs or pockets for the lodgement of coal.

The aforesaid rotor is rotatably mounted on a base having means associated therewith for traversing the assemblage towards the heap of material. For example, the traversing means may either comprise a motor-driven haulage drum and haulage cable, or the assemblage may be mounted on motor-driven caterpillar tracks. By these means, the elevating members are progressively fed into the heap of material.

A feature of the invention consists in that means are provided for increasing the angle of slope of at least a part of the discharge surface of each trough along which the material rolls or slides during discharge in relation to a radius by the time that the surface has passed the upper limit of its travel.

For the above purpose, said surface part may be adjustable so that when its angle of slope is being increased, one extremity of the part sweeps along the scooping surface in a direction to eject the material from the trough.

The back of each blade is arranged to form a fixed outer portion of the discharge surface of the succeeding trough. In such an arrangement, the aforesaid adjustable surface part may be pivoted to said fixed portion.

The back of each scooping surface is preferably flat, whereas its front surface is cylindrical, having a radius of curvature approximately equal to the length of the pivoted discharge surface.

The face of the adjustable surface may be curved so that at the limit of its discharging movement, the curve, where it meets the flat rear face of the preceding scooping surface, is tangential thereto.

The means for effecting the discharging movement of the adjustable wall part may comprise a cam fixed against rotation and arranged successively to engage cam followers on said adjustable parts. For example, the cam followers may comprise rollers mounted on the back of said adjustable parts at a distance away from their pivotal mountings.

The loading apparatus above described is arranged with its rotor axis extending between the coal face and the face conveyor, and is arranged to discharge the coal onto a cross conveyor, e. g., of the belt type extending transversely to and delivering onto the face conveyor. Since, according to the present invention, the height of discharge of the loader is increased, the coal may readily be discharged onto the top stretch of a belt conveyor, which under certain conditions, is preferable to discharging it onto the lower stretch.

In order to permit the use of the invention in the long-wall method of mining referred to above it is characterised in that shaft carrying the rotor is provided with a driving member intermediate of the ends of the shaft, and in that the scoop-like troughs on the rotor are so constructed and arranged as to provide a gap opposite said driving member through which means for transmitting a drive thereto may extend. Preferably, the driving member and said gap are centrally disposed on the rotor. A reversible drive may be provided for the aforesaid conveyor, so that it may travel in the appropriate direction for transferring the delivered coal to the face conveyor.

In order to prevent the material being loaded from entering the gap between the troughs, a shield is arranged opposite said gap.

The rotor shaft is supported at each end by bearings carried in a suitable framework, and the aforesaid rotor shaft is arranged to extend beyond the bearings and framework and carries an end cutter-wheel which removes any projecting coal out of the path of the framework and bearings and forms a clearance in the coal face. By these means, practically the whole of the frontal area of the machine is made up of coal moving or cutting parts, thus preventing heavy obstruction to the gear for hauling the apparatus and the tendency for coal to pile up in the path of the machine.

In one form of construction according to this invention, a wormwheel is secured to the rotor shaft in a mid position, and a wormshaft driven through suitable gearing engages the underside of the wormwheel.

The following is a detailed description of my coal loading apparatus suitable for use in the long wall method of working, reference being made to the accompanying drawing, in which—

Figure 6 is a side elevation looking from the left of Figure 5 with the cutter wheel and bearing support removed.

Figure 1:
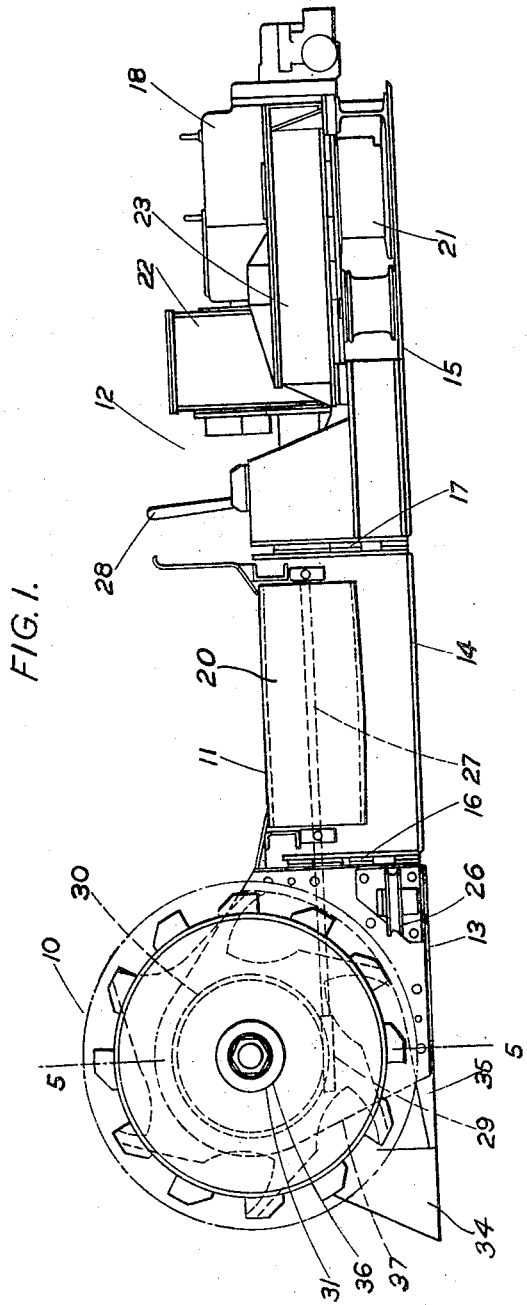
Figure 1 is a side elevation of the apparatus.

Referring to Figure 1, it will be seen that the loading apparatus is built up in three main sections, a rotor section 10, a conveyor section 11, and a drive section 12. The sections are provided with base plates 13, 14 and 15, and the adjacent sides of the base plates have abutting uprights 16 and 17 which are bolted together.

Figure 2:
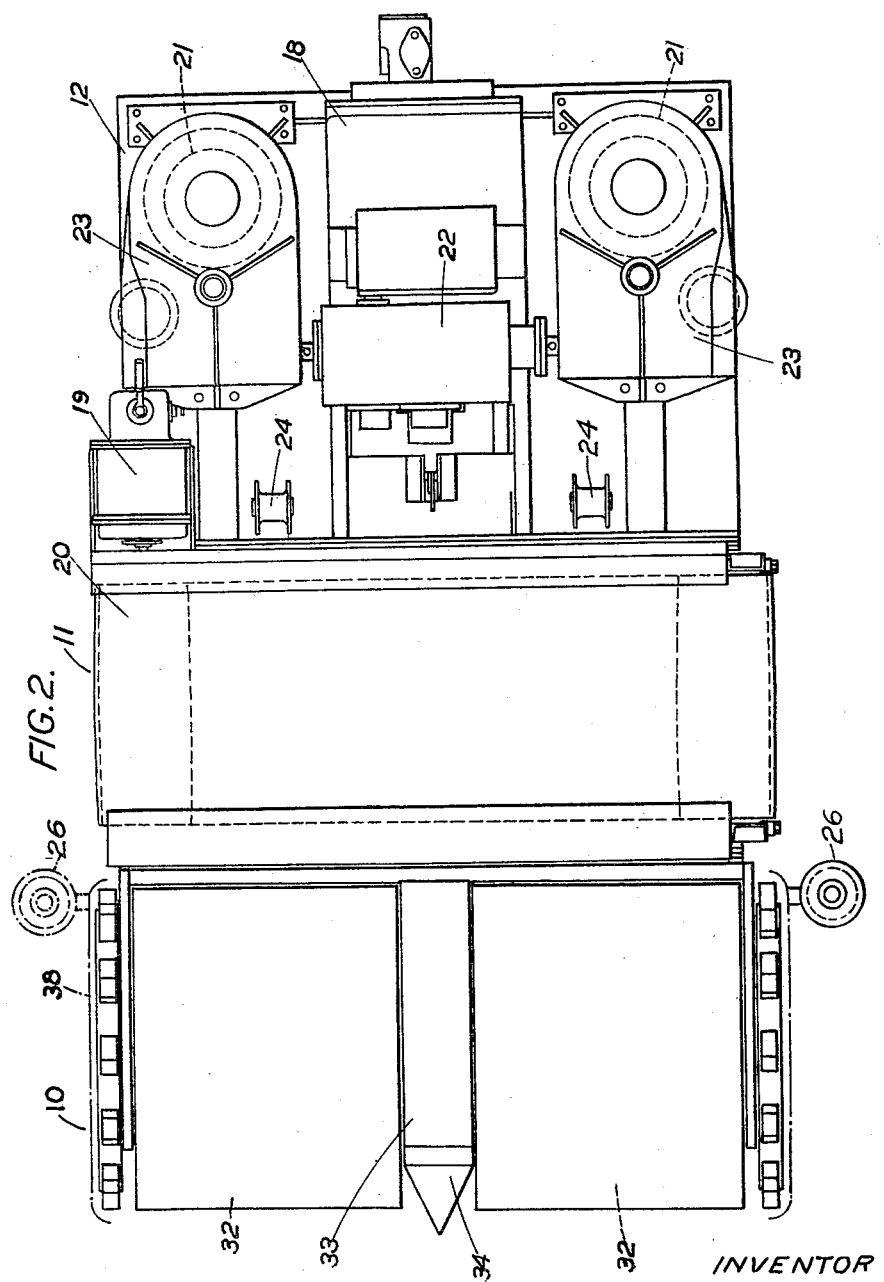
Figure 2 is a plan view of the apparatus shown in Figure 1.
Figure 3:
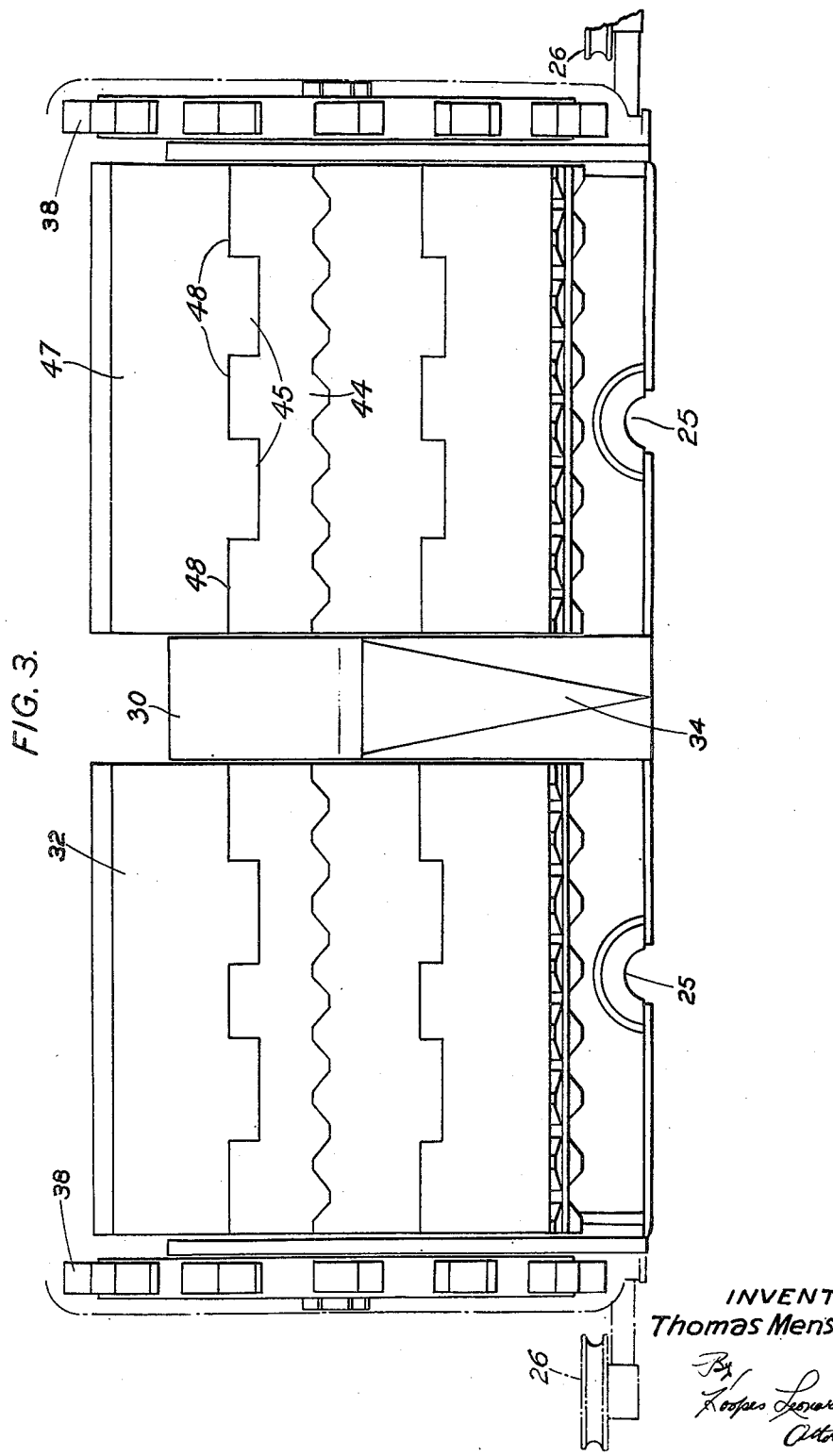
Figure 3 is a front end elevation looking from the left in Fig. 1.
Figure 4:
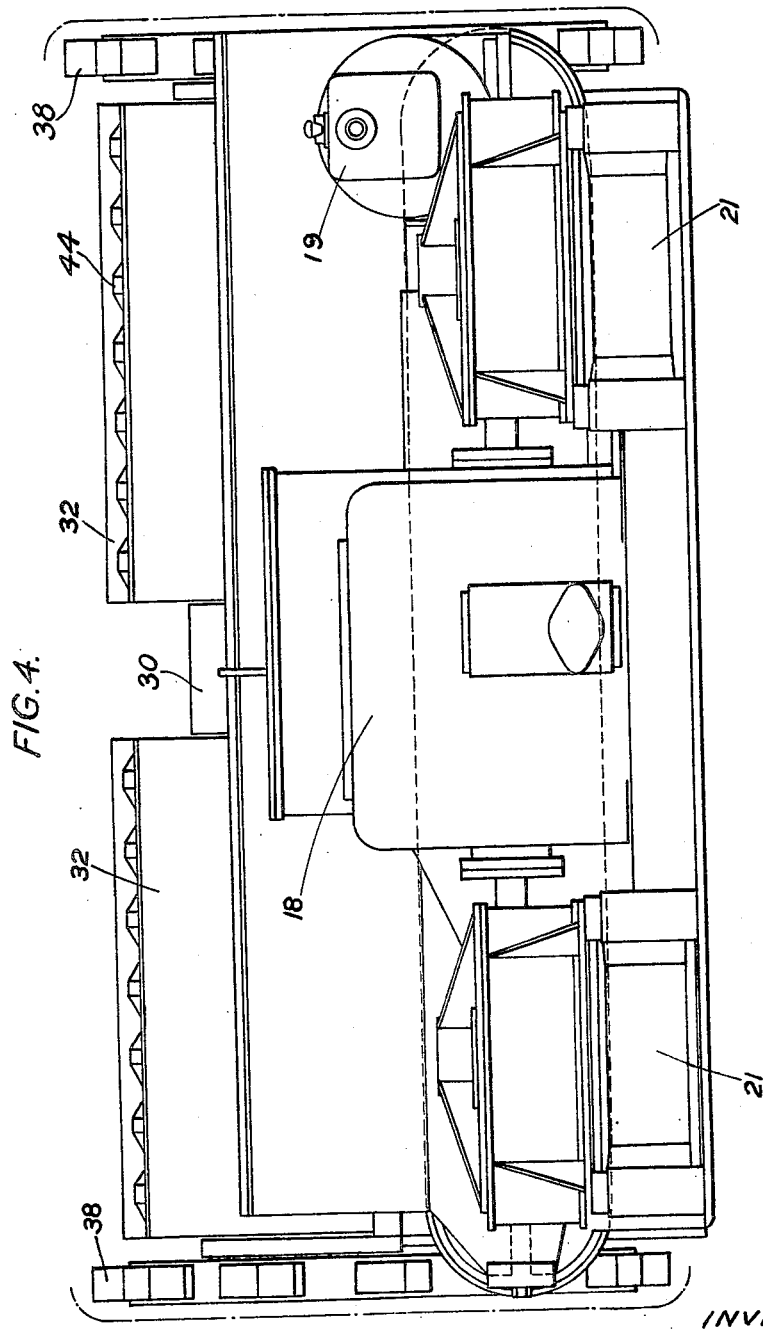
Figure 4 is a rear end elevation i. e., looking from the right in Fig. 1.

Referring to Figure 2, the driving section is provided with two motors 18 and 19, the former being about 30 horsepower, and the latter about 4½ horsepower. The motor 19 is arranged to drive the cross-conveyor 20 which may be of the type comprising cross-slats secured between driving chains passing over suitable sprockets on shafts at the ends of the conveyor. The motor 18 drives two haulage drums 21 arranged on either side of the apparatus with their axes vertical, the drive being effected through gearboxes 22 and 23. Cables from the drums may pass around guide pulleys 24 and through suitable guide channels arranged along the base of the apparatus, and out through the front of the machine, which guide channels are indicated at 25 in Figure 3. In order to assist in turning the machine, the cables may be passed around removable bollards 26 at the sides of the machine. The motor 18 also drives a shaft 27 (shown dotted in Figure 1) through the gearbox 22 embodying a clutch mechanism controlled by a lever 28. The shaft 27 is provided at the forward end thereof with a worm 29 which engages a wormwheel 30 secured to the rotor shaft 31. The shaft 27 extends between the upper and lower stretches of the conveyor 11. The rotor is formed in two parts, indicated at 32 and 32' in Figure 2, which are spaced apart on either side of the wormwheel 30. The wormwheel may be surrounded by a casing 33 having an opening at the rear thereof through which the shaft 27 extends, and secured to the front of the casing is a wedge-shaped member 34 which projects slightly in front of the rotors and is inclined upward and rearwardly, the function of which wedge-shaped member is to direct the material away from the gap between the two rotors and on to the two rotors. Secured to the base plate 13, beneath the rotors is a ramp 35 which, as the machine is traversed into the heap, tends to raise the material towards the lower side of the rotors.

Figure 5:
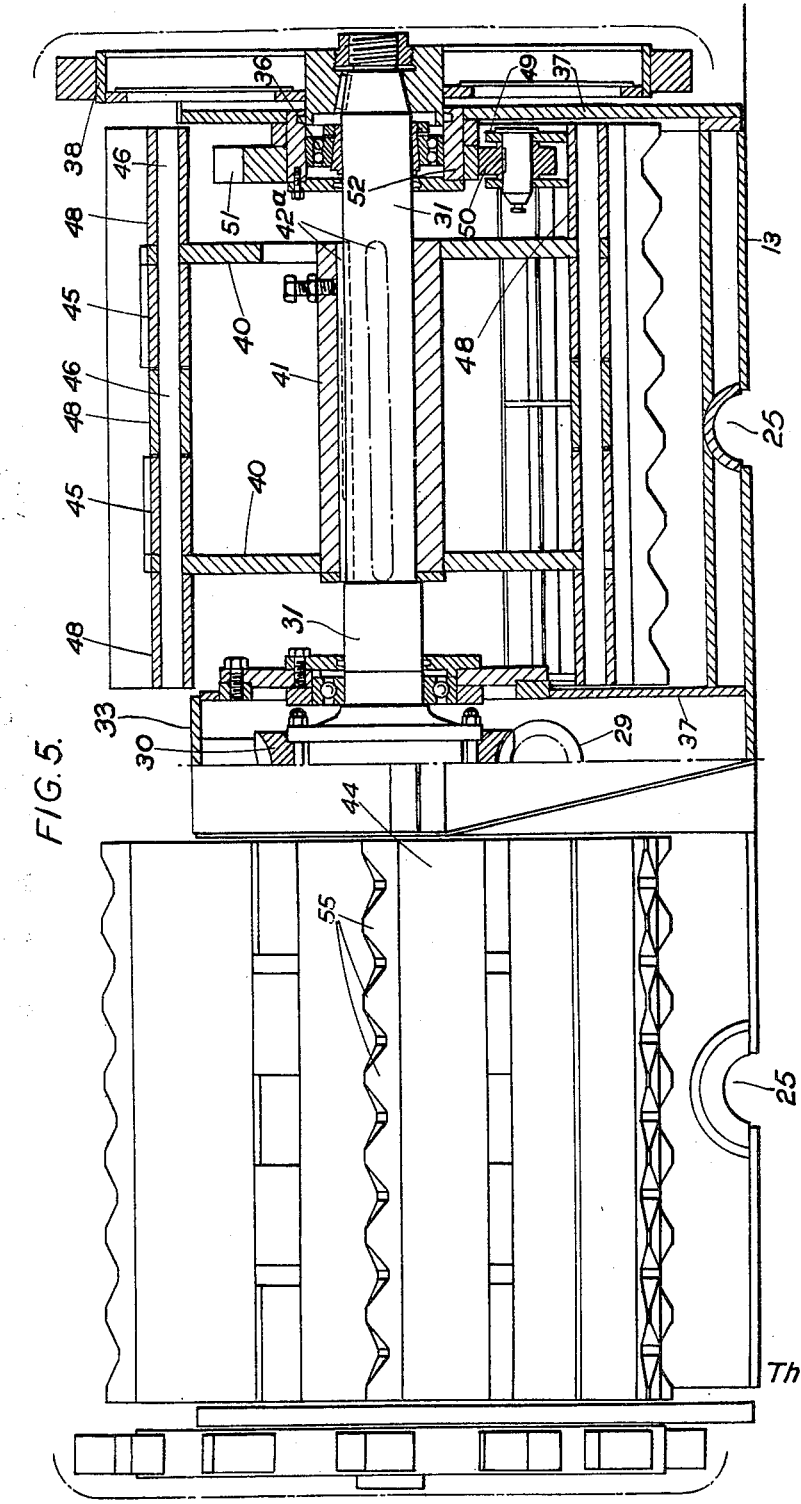
Figure 5 is a view partly in front elevation and partly in section on the line 5—5 of Figure 1.

The rotor shaft 31 is carried in bearings 36 (see Fig. 5) mounted on side-plates 37 which are secured by suitable angle-irons to the baseplate 13 and uprights 16. The shaft extends beyond each side-plate and has secured to each end thereof a cutter-disc 38. As best seen in Figures 5 and 6, each rotor comprises two spider members 40 fixed to a hub member 41 keyed by keys 41a to the rotor-shaft 31. Each spider is provided with a number of radially extending projections 42 (see Figure 6) having faces 43 to which scoop members 44 are welded. Spaced apart at the base of each scoop member are two bosses 45 through which extends a rod 46. An ejecting member 47 having three bosses 48 spaced apart along the length thereof is mounted on this rod and one of the end bosses (shown to the right of Figure 5) is provided with a forkarm 49 carrying a roller 50. The roller engages a cam-member 51 fixed to the outside of the housing 52 for the bearing 36. With this arrangement, rotation of the rotor as a whole causes each ejecting member 47 in turn to oscillate about the axis of the rod 46, and its outer extremity 53 (see Figure 6) sweeps across the cylindrical surface 54 of the scoop member 44, which surface has a radius of curvature corresponding to the radius of the ejecting member 47. The back of each scoop member on the other hand is flat as indicated at 56 and forms a discharge surface which becomes tangential to the cylindrical surface 54 of the ejecting member when the outer extremity of the surface 54 approaches the upper stretch of the conveyor as seen to the left of Figure 6. The surface 54 bridges the space between the back of one scoop member and the front face of the next. The outer edge of the scoop member 44 may be provided with teeth 55, as shown on the left hand side of Figure 5.

For a coal-loading apparatus the drum may be arranged to rotate about 6 to 12 revolutions per minute, and at this rate the coal may be discharged on to the top of the cross-conveyor having the upper stretch of the conveyor about 18 inches above floor level. The cam is so arranged that the movement of the ejecting member is complete by 25° in advance of the point where the outer extremity of the ejecting member is opposite the upper stretch of the conveyor. At this time, the angle of inclination of the flat portion 56 is at an angle of about 20° to the horizontal, while the curved surface is at a considerably greater angle. The return movement of the ejecting member may be arranged to commence when its outer edge has moved downwardly from the upper stretch of the conveyor by an amount corresponding to 10° rotation of the rotor. The ejecting movement and return movement each take place during a 30° movement of the rotor at appropriate times in the cycle.

I claim:

1. Loading apparatus comprising a rotor, longitudinally extending scoop members circumferentially spaced around said rotor and disposed in two groups which are spaced therealong each scoop member having a forward lifting surface and a rear surface adapted to guide material discharged from a following scoop member, an ejecting member disposed between the rear surface of each scoop member and the lifting surface of the following scoop member and means for driving the rotor disposed between said groups.

2. Loading apparatus comprising a rotor, longitudinally extending scoop members circumferentially spaced around said rotor and disposed in two groups which are spaced therealong each scoop member having a forward lifting surface and a rear surface adapted to guide material discharged from a following scoop member, an ejecting member disposed between the rear surface of each scoop member and the lifting surface of the following scoop member and a plough shield overlying in front of the space between said groups.

3. Loading apparatus comprising a rotor, longitudinally extending scoop members circumferentially spaced around said rotor and disposed in two groups which are spaced therealong each scoop member having a forward lifting surface and a rear surface adapted to guide material discharged from a following scoop member, an ejecting member disposed between the rear surface of each scoop member and the lifting surface of the following scoop member and a wormwheel between said groups and a wormshaft co-operating therewith for driving said rotor.

4. Loading apparatus comprising a rotor, longitudinally extending scoop members circumferentially spaced around said rotor, each of which scoop members comprises a concavely curved lifting surface extending outwardly from the axis of said rotor and a rear face extending from the outer extremity of the lifting surface inwardly towards said rotor axis, an ejecting member pivotally connected to the inner extremity of said rear face so as to be capable of sweeping over the curved lifting surface of an adjacent scoop member and means for effecting said sweeping movement after a predetermined upward movement of a concavely curved lifting surface.

5. Loading apparatus comprising a rotor, longitudinally extending scoop members circumferentially spaced around said rotor, each of which scoop members comprises a concavely curved lifting surface extending outwardly from the axis of said rotor and a rear face extending from the outer extremity of the lifting surface inwardly towards said rotor axis, an ejecting member pivotally connected to the inner extremity of said rear face so as to be capable of sweeping over the curved lifting surface of an adjacent scoop member, which ejecting member is concave outwardly, and means for effecting said sweeping movement after a predetermined upward movement of a concavely curved lifting surface.

6. Loading apparatus comprising a rotor, longitudinally extending scoop members circumferentially spaced around said rotor, each of which scoop members comprises a concavely curved lifting surface extending outwardly from the axis of said rotor and a rear face extending from the outer extremity of the lifting surface inwardly towards said rotor axis, an ejecting member pivotally connected to the inner extremity of said rear face so as to be capable of sweeping over the curved lifting surface of an adjacent scoop member, which ejecting member is so shaped that when in the discharge position it is substantially a continuation of the rear face of the preceding scoop member and means for effecting said sweeping movement after a predetermined upward movement of a concavely curved lifting surface.

7. Loading apparatus comprising a rotor, longitudinally extending scoop members circumferentially spaced around said rotor, each of which scoop members comprises a concavely curved lifting surface extending outwardly from the axis of said rotor and a rear face extending from the outer extremity of the lifting surface inwardly towards said rotor axis, an ejecting member pivotally connected to the inner extremity of said rear face so as to be capable of sweeping over the curved lifting surface of an adjacent scoop member and means for effecting said sweeping movement after a predetermined upward movement of a concavely curved lifting surface, the concavely curved lifting surface of each of which scoop members is cylindrical about an axis through the pivots of the ejecting member.

8. Loading apparatus comprising a rotor, longitudinally extending scoop members circumferentially spaced around said rotor, each of which scoop members comprises a curved lifting surface extending outwardly from the axis of said rotor and a flat rear face extending from the outer extremity of the lifting surface inwardly towards said rotor axis, an ejecting member pivotally connected to the inner extremity of said rear face so as to be capable of sweeping over the curved lifting surface of an adjacent scoop member, which ejecting member is concave outwardly and is so arranged that said flat face is tangential to it in the discharge position.

9. Loading apparatus comprising a rotor, a shaft carrying said rotor, spaced bearings supporting said shaft which projects beyond said bearings, cutter wheels mounted on the projecting ends of said shaft, longitudinally extending scoop members circumferentially spaced around said rotor, each of which scoop members comprises a concavely curved lifting surface extending outwardly from the axis of said rotor and a rear face extending from the outer extremity of the lifting surface inwardly towards said rotor axis, an ejecting member pivotally connected to the inner extremity of said rear face so as to be capable of sweeping over the curved lifting surface of an adjacent scoop member and means for effecting said sweeping movement after a predetermined upward movement of a concavely curved lifting surface.

10. Loading apparatus comprising a rotor having longitudinally extending scoop members circumferentially spaced around said rotor and disposed in two groups spaced therealong, means for driving said rotor which means are disposed between said groups and an endless conveyor disposed longitudinally across said two groups and adapted to receive the material falling therefrom.

11. Loading apparatus comprising a rotor having longitudinally extending scoop members circumferentially spaced around said rotor and disposed in two groups spaced therealong, a plough shield overlying in front of the space between said groups and an endless conveyor disposed longitudinally across said two groups and adapted to receive the material falling therefrom.

12. Loading apparatus comprising a rotor having longitudinally extending scoop members circumferentially spaced around said rotor and disposed in two groups spaced therealong a wormwheel on said rotor between said groups, a wormshaft engaging said wormwheel and an endless conveyor disposed longitudinally across said two groups and adapted to receive the material falling therefrom.

THOMAS MENSFORTH.

REFERENCES CITED

The following references are of record in the file of this patent:

UNITED STATES PATENTS

| Number | Name | Date |
|---|---|---|
| 1,245,656 | Anderson | Nov. 6, 1917 |
| 1,302,046 | Hunt | Apr. 26, 1919 |
| 1,494,622 | Oldroyd | May 20, 1924 |
| 1,581,685 | Oldroyd | Apr. 20, 1926 |
| 1,700,294 | Levin | Jan. 29, 1929 |
| 1,930,016 | Moore | Oct. 10, 1933 |
| 2,365,635 | Hart | Dec. 19, 1944 |